(12) United States Patent
Warth et al.

(10) Patent No.: US 7,081,490 B2
(45) Date of Patent: Jul. 25, 2006

(54) POLYMER BLENDS CONTAINING MODIFIED POLYESTERS

(75) Inventors: Holger Warth, Dormagen (DE); Dieter Wittmann, Leverkusen (DE); Heinrich Alberts, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/776,819

(22) Filed: Jun. 10, 2004

(65) Prior Publication Data

US 2004/0249072 A1    Dec. 9, 2004

Related U.S. Application Data

(63) Continuation of application No. 10/089,134, filed as application No. PCT/EP00/09015 on Sep. 15, 2000, now abandoned.

(30) Foreign Application Priority Data

Sep. 28, 1999 (DE) ................................ 199 46 323

(51) Int. Cl.
*C08G 63/00* (2006.01)
*C08L 51/00* (2006.01)
(52) U.S. Cl. .................... 524/115; 524/121; 525/67
(58) Field of Classification Search ................ 525/63, 525/66, 67, 68; 524/115, 121
See application file for complete search history.

(56) References Cited

U.S. PATENT DOCUMENTS

| 3,856,884 A | 12/1974 | Sakai et al. |
| 5,416,161 A | 5/1995 | Nielinger et al. ............. 525/67 |
| 5,756,576 A | 5/1998 | Bruls et al. .................. 525/66 |

FOREIGN PATENT DOCUMENTS

| EP | 0 846 729 | 6/1998 |
| EP | 1 116 750 | 7/2001 |
| JP | 9-302205 | 11/1997 |
| JP | 10-245481 | 9/1998 |
| WO | 98/24844 | 6/1998 |

OTHER PUBLICATIONS

Patent Abstracts Of Japan, vol. 1997, No. 04, Apr. 30, 1997 & JP 08 325444 A (Mitsubishi Chem Corp), Dec. 10,1996 Zusammenfassung.
Patent Abstracts of Japan, vol. 017, No. 001 (C-1014), Jan. 5, 1993 & JP 04 239529 A (Teijin Ltd), Aug. 27, 1992 Zusammenfassung.
Database Chemabs [Online] Chemical Abstracts Service, Columbus, Ohio, US; Anon.: "Poly(ethylenenaphthalenedicarboxylate)/ polycarbonate blends" retrieved from STN Database accession No. 107:237778 XP002156621 Zusammenfassung & Res. Discl. (1987), 283, 667-9.
Database Chemabs [Online] Chemical Abstracts Service, Columbus, Ohio, US; Nakamura, Yoshitsugu et al: "Polyester molding compositions with good color stability" retrieved from STN Database accession No. 84:60505 XP002156622 Zusammenfassung & JP 50 067355 A (Teijin, Ltd., Japan) Jun. 6, 1975.
Database Chemabs [Online] Chemical Abstracts Service, Columbus, Ohio, US; Ueno, Makoto et al: "Resin Compositions to give molded articles with pearllike luster" retrieved from STN Database accession No. 82:141098 XP002156623 Zusammenfassung & JP 49 129748 A (Teijin Chemical Industry Co., Ltd.) Dec. 12 1974.
Brazil Polim. Technol., 8 (month unavailable) 1998, pp. 55-67, "Poli(Etileno Naftalato—PEN: Uma Revisão do seu Histórico e as Principals Tendeências de sua Aplucação Mundial." by Edilene de Cássia D. Nunes et al.
Tranreactions in Condensation Polymers, Chapter 10, pp. 411-427, (month unavailable) 1999, "Effects of Transreactions on the Compatibility and Miscibility of Blends of Condensation Polymers" by M. Xanthos and H. Warth.

*Primary Examiner*—Jeffrey Mullis
(74) *Attorney, Agent, or Firm*—Joseph C. Gil; Aron Preis

(57) ABSTRACT

The present invention relates to polymer blends containing a component selected from the group poly(ester)carbonates, graft polymers or mixtures thereof, polyalkylene naphthalate as the second component optionally together with a further component selected from the group of vinyl (co)polymers, polyalkylene terephthalates or mixtures thereof, wherein mixtures of polycarbonate, polyalkylene naphthalate and optionally polyalkylene terephthalate contain no tetrafluoroethylene polymer.

11 Claims, No Drawings

POLYMER BLENDS CONTAINING MODIFIED POLYESTERS

This application is a continuation of U.S. Ser. No. 10/089,134, filed Mar. 25, 2002, now abandoned which is a national stage application of PCT/EP00/09015, filed Sep. 15, 2000.

The present invention relates to polymer blends containing modified polyesters, in particular having improved optical properties and to the use thereof.

EP-A 0603664 describes, for example, polymer blends which consist of polycarbonates and ABS polymers. Further examples of polymer blends containing polycarbonates may be found in JP-A10245481 and EP-A 846729.

Polycarbonates combined with graft polymers are furthermore described in EP-A 0785234.

It is also known to use polymer blends containing polyethylene terephthalates and polyethylene naphthalates. The principal areas of application are the production of plastics bottles having improved properties. This subject is addressed, for example, in the following review articles:
- E. Nunes, J. Agnelli, R. Rossi: *Brazil. Polim. Tecnol.* 8 (1998) 55–67
- M. Xanthos, H. Warth, S. Fakirov (ed.), *Transreactions in Condensation Polymers,* chapter 10, Wiley, 1999.

WO 9824844 furthermore describes the control of transesterification in polyethylene terephthalate/polyethylene naphthalate blends. The UV properties of bottles are furthermore described in JP-A 09302205.

Optical properties, in particular natural colour tone and colour effects, require improvement, especially in visible components.

The object of the present invention is accordingly to provide polymer blends which exhibit improved colour, improved natural colour tone (lighter natural colour tone) and improved processing behaviour, for example when producing thin-walled parts.

This object is achieved according to the invention by polymer blends containing a component selected from the group of poly(ester)carbonate A, graft polymer B or mixtures thereof, polyalkylene naphthalate C optionally together with a further component D selected from among vinyl (co)polymer D1, polyalkylene terephthalate D2 or mixtures thereof, wherein mixtures of polycarbonate, polyalkylene naphthalate and optionally polyalkylene terephthalate contain no tetrafluoroethylene polymer.

Preferred polymer blends according to the invention are in particular those containing:
1. polycarbonate, polyalkylene terephthalate, preferably polybutylene terephthalate and polyalkylene naphthalate,
2. polycarbonate, graft polymer and polyalkylene naphthalate,
3. graft polymer and polyalkylene naphthalate,
4. graft polymer, polyalkylene terephthalate and polyalkylene naphthalate or
5. polycarbonate and polyalkylene naphthalate, with the exception of tetrafluoroethylene polymer.

The graft polymers may be replaced entirely or in part by vinyl (co)polymers.

The stated polymer blends preferably contain 0.2 to 99 parts by weight of polyalkylene naphthalate. Particularly preferably 0.4 to 85 parts by weight, very particularly preferably 0.6 to 75 parts by weight are polyalkylene naphthalate. The polymer blends may contain from 1 to 99.8 parts by weight of polycarbonate A, graft polymer B or mixtures thereof. 15 to 99.6 parts by weight are preferred, 25 to 99.4 parts by weight being very particularly preferred.

The polymer blends may contain up to 85 parts by weight of vinyl (co)polymer and polyalkylene terephthalate as well as mixtures thereof. 3 to 80 parts by weight are preferred, in particular 5 to 75 parts by weight. The sum of components A to D used is 100 parts by weight.

The following quantities are preferred for group 1:

| | |
|---|---|
| polycarbonate | 5–98 parts by weight, particularly preferably 10–95 parts by weight, very particularly preferably 15–80 parts by weight; |
| polyalkylene terephthalate | 0–80 parts by weight, particularly preferably 5–75 parts by weight, very particularly preferably 15–75 parts by weight, most preferably 20–70 parts by weight; |
| polyalkylene naphthalate | 1–80 parts by weight, particularly preferably 2–70 parts by weight. |

In those cases in which the polycarbonate/polyalkylene naphthalate mixtures contain >0 parts by weight of polyalkylene terephthalate, this latter is preferably present in quantities of 5 to 75 parts by weight.

The following quantities are preferred for group 2 (parts by weight):

| | | particularly preferably | very particularly preferably |
|---|---|---|---|
| polycarbonate | 5–98 | 10–95 | 20–90 |
| graft polymer | 1–80 | 3–60 | 5–40 |
| polyalkylene naphthalate | 0.2–80 | 0.4–60 | 1–40 |
| vinyl (co)polymer | 0–60 | 1–40 | 2–30 |

The following quantities are preferred for group 3 (parts by weight):

| | | particularly preferably | very particularly preferably | most preferably |
|---|---|---|---|---|
| graft polymer | 1–80 | 3–60 | 5–40 | |
| polyalkylene naphthalate | 0.2–80 | 0.4–60 | 1–40 | |
| vinyl(co)polymer/ polyalkylene terephthalate | 0–95 | 5–90 | 10–85 | 40–80 |

The present invention furthermore also relates to the use of the polymer blends for the production of mouldings.

Component A

Component A aromatic polycarbonates and/or aromatic polyestercarbonates which are suitable according to the invention are known from the literature or may be produced using processes known from the literature (see with regard to the production of aromatic polycarbonates, for example, Schnell *Chemistry & Physics of Polycarbonates,* Interscience Publishers, 1964 and DE-A 1 495 626, DE-A 2 232 877, DE-A 2 703 376, DE-A 2 714 544, DE-A 3 000 610, DE-A 3 832 396; with regard to the production of aromatic polyestercarbonates, for example, DE-A 3 077 934).

Aromatic polycarbonates are produced, for example, by reacting diphenols with carbonic acid halides, preferably phosgene, and/or with aromatic dicarboxylic acid dihalides, preferably benzenedicarboxylic acid dihalides, using the phase interface process, optionally using chain terminators, for example monophenols, and optionally using trifunctional or greater than trifunctional branching agents, for example triphenols or tetraphenols.

Diphenols for the production of the aromatic polycarbonates and/or aromatic polyestercarbonates are preferably those of the formula (I)

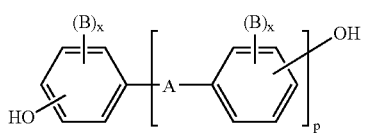

wherein
A is a single bond, $C_1$–$C_5$ alkylene, $C_2$–$C_5$ alkylidene, $C_5$–$C_6$ cycloalkylidene, —O—, —SO—, —CO—, —S—, —SO$_2$—, $C_6$–$C_{12}$ arylene, onto which further aromatic rings optionally containing heteroatoms may be fused, or a residue of the formula (II) or (III)

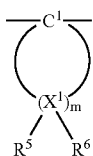

(II)

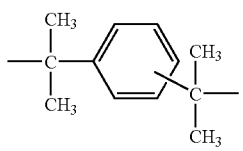

(III)

B is in each case hydrogen, $C_1$–$C_{12}$ alkyl, preferably methyl, halogen, preferably chlorine and/or bromine,
x is mutually independently 0, 1 or 2,
p is 1 or 0 and
$R^5$ and $R^6$ individually selectably for each $X^1$ are mutually independently hydrogen or $C_1$–$C_6$ alkyl, preferably hydrogen, methyl or ethyl,
$X^1$ means carbon and
m means an integer from 4 to 7, preferably 4 or 5, providing that $R^5$ and $R^6$ are simultaneously alkyl on at least one atom $X^1$.

Preferred diphenols are hydroquinone, resorcinol, dihydroxydiphenols, bis(hydroxyphenyl)-$C_1$–$C_5$-alkanes, bis-(hydroxyphenyl)-$C_5$–$C_6$-cycloalkanes, bis(hydroxyphenyl) ethers, bis-(hydroxyphenyl) sulfoxides, bis-(hydroxyphenyl) ketones, bis-(hydroxyphenyl) sulfones and α,α-bis(hydroxyphenyl)diisopropylbenzenes together with the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis-(4-hydroxyphenyl)cyclohexane, 1,1-bis-(4-hydroxyphenyl)-3,3,5-trimethylcyclohexane, 4,4'-dihydroxydiphenyl sulfide, 4,4'-dihydroxyldiphenyl sulfone and the di- and tetrabrominated or chlorinated derivatives thereof, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane.

2,2-Bis-(4-hydroxyphenyl)propane (bisphenol A) is particularly preferred.

The diphenols may be used individually or as any desired mixtures.

The diphenols are known from the literature or may be obtained using processes known from the literature.

Suitable chain terminators for the production of the thermoplastic, aromatic polycarbonates are, for example, not only phenol, p-chlorophenol, p-tert.-butylphenol or 2,4,6-tribromophenol, but also long-chain alkylphenols, such as 4-(1,3-tetramethylbutyl)phenol according to DE-OS 2 842 005 or monoalkylphenol or dialkylphenols having a total of 8 to 20 C atoms in the alkyl substituents, such as 3,5-di-tert.-butylphenol, p-isooctylphenol, p-tert.-octylphenol, p-dodecylphenol and 2-(3,5-dimethylheptyl)phenol and 4-(3,5-dimethylheptyl)phenol. The quantity of chain terminators to be used is in general between 0.5 mol % and 10 mol %, relative to the total number of moles of diphenols used in each case.

The thermoplastic, aromatic polycarbonates have weight average molecular weights ($M_w$, measured, for example, by ultracentrifugation or light scattering) of 10000 to 200000, preferably of 20000 to 80000.

The thermoplastic, aromatic polycarbonates may be branched in known manner, namely preferably by incorporating 0.05 to 2.0 mol %, relative to the sum of diphenols used, of trifunctional or greater than trifunctional compounds, for example those having three and more phenolic groups.

Both homopolycarbonates and copolycarbonates are suitable. Component A copolycarbonates according to the invention may be produced by also using 1 to 25 wt. %, preferably 2.5 to 25 wt. % (relative to the total quantity of diphenols to be used) of polydiorganosiloxanes having hydroxyaryloxy end groups. These compounds are known (c.f. for example U.S. Pat. No. 3,419,634) or may be produced using methods known from the literature. The production of copolycarbonates containing polydiorganosiloxane is described, for example, in DE-OS 3 334 782.

Apart from the bisphenol A homopolycarbonates, preferred polycarbonates are the copolycarbonates of bisphenol A with up to 15 mol %, relative to the total number of moles of diphenols, of other diphenols stated as preferred or particularly preferred, in particular 2,2-bis-(3,5-dibromo-4-hydroxyphenyl)propane.

Aromatic dicarboxylic acid dihalides for the production of aromatic polyestercarbonates are preferably the diacid dichlorides of isophthalic acid, terephthalic acid, 4,4'-diphenyl ether dicarboxylic acid and 2,6-naphthalenedicarboxylic acid.

Mixtures of the diacid dichlorides of isophthalic acid and terephthalic acid in a ratio of between 1:20 and 20:1 are particularly preferred.

A carbonic acid halide, preferably phosgene, is used as a difunctional acid derivative in the production of polyestercarbonates.

Chain terminators which may be considered for the production of the aromatic polyestercarbonates include, apart from the above-stated monophenols, the chloroformates thereof and the acid chlorides of aromatic monocarboxylic acids, which may optionally be substituted by $C_1$–$C_{22}$ alkyl groups or by halogen atoms, together with aliphatic $C_2$–$C_{22}$ monocarboxylic acid chlorides.

The quantity of chain terminators is in each case 0.1 to 10 mol %, relative, in the case of the phenolic chain terminators, to the number of moles of diphenols and, in the case of monocarboxylic acid chloride chain terminators, to the number of moles of dicarboxylic acid dichlorides.

The aromatic polyestercarbonates may also contain incorporated aromatic hydroxycarboxylic acids.

The aromatic polyestercarbonates may be both linear and branched in known manner (c.f. in this connection also DE-A 2 940 024 and DE-A 3 007 934).

Branching agents which may be used are, for example, tri- or polyfunctional carboxylic acid chlorides, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in quantities of 0.01 to 1.0 mol % (relative to dicarboxylic acid dichlorides used) or tri- or polyfunctional phenols, such as phloroglucinol, 4,6-dimethyl-2,4,6-tri-(4-hydroxyphenyl)heptene, 2,4,4-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl) phenylmethane, 2,2-bis-[4,4-bis-(4-hydroxyphenyl)cyclohexyl]propane, 2,4-bis-(4-hydroxyphenylisopropyl)phenol, tetra-(4-hydroxyphenyl)methane, 2,6-bis-(2-hydroxy-5-methylbenzyl)-4-methylphenol, 2-(4-hydroxyphenyl)-2-(2,4-dihydroxyphenyl)propane, tetra-(4-[4-hydroxyphenylisopropyl]phenoxy)methane, 1,4-bis-[4,4'-dihydroxytriphenyl) methyl]benzene, in quantities of 0.01 to 1.0 mol %, relative to diphenols used. Phenolic branching agents may be introduced initially with the diphenols, while acid chloride branching agents may be introduced together with the acid dichlorides.

The proportion of carbonate structural units in the thermoplastic, aromatic polyestercarbonates may be varied at will. The proportion of carbonate groups is preferably up to 100 mol %, in particular up to 80 mol %, particularly preferably up to 50 mol %, relative to the sum of ester groups and carbonate groups. Both the ester and carbonate fractions of the aromatic polyestercarbonates may be present as blocks or randomly distributed in the polycondensation product.

The relative solution viscosity ($\eta_{rel.}$) of the aromatic polycarbonates and aromatic polyestercarbonates is in the range from 1.18 to 1.4, preferably from 1.22 to 1.3 (measured on solutions of 0.5 g of polycarbonate or polyestercarbonate in 100 ml of methylene chloride solution at 25° C.).

The thermoplastic, aromatic polycarbonates and polyestercarbonates may be used alone or in any desired mixture with each other.

Component B

The rubber-modified graft polymer B comprises a random (co)polymer of monomers according to B.1.1 and/or B.1.2, together with a rubber B.2 grafted with the random (co) polymer of B.1.1 and/or B.1.2, wherein B is produced in known manner using a bulk or solution or bulk/suspension polymerisation process, as described for example in U.S. Pat. No. 3,243,481, U.S. Pat. No. 3,509,237, U.S. Pat. No. 3,660,535, U.S. Pat. No. 4,221,833 and U.S. Pat. No. 4,239,863.

Examples of monomers B.1.1 are styrene, α-methylstyrene, halo- or alkyl-ring-substituted styrenes such as p-methylstyrene, p-chlorostyrene, (meth)acrylic acid $C_1$–$C_8$ alkyl esters such as methyl methacrylate, n-butyl acrylate and t-butyl acrylate. Examples of monomers B.1.2 are unsaturated nitriles such as acrylonitrile, methacrylonitrile, (meth) acrylic acid $C_1$–$C_8$ alkyl esters such as methyl methacrylate, n-butyl acrylate, t-butyl acrylate, derivatives (such as anhydrides and imides) of unsaturated carboxylic acids such as maleic anhydride and N-phenylmaleimide or mixtures thereof.

Preferred monomers B.1.1 are styrene, α-methylstyrene and/or methyl methacrylate, preferred monomers B.1.2 are acrylonitrile, maleic anhydride and/or methyl methacrylate.

Particularly preferred monomers are B.1.1 styrene and B.1.2 acrylonitrile.

Rubbers B.2 suitable for the rubber-modified graft polymers B are, for example, diene rubbers, EP(D)M rubbers, i.e. those based on ethylene/propylene and optionally diene, acrylate, polyurethane, silicone, chloroprene and ethylene/vinyl acetate rubbers.

Preferred rubbers B.2 are diene rubbers (for example based on butadiene, isoprene etc.) or mixtures of diene rubbers or copolymers of diene rubbers or the mixtures thereof with further copolymerisable monomers (for example according to B.1.1 and B.1.2), providing that the glass transition temperature of component B.2 is below 10° C., preferably below −10° C. Pure polybutadiene rubber is particularly preferred.

Component B may, if necessary and if the rubber properties of component B.2 are not consequently impaired, additionally also contain small quantities, conventionally less than 5 wt. %, preferably less than 2 wt. %, relative to B.2, of ethylenically unsaturated monomers having a crosslinking action. Examples of such monomers having a crosslinking action are alkylenediol di(meth)acrylates, polyester di(meth)acrylates, divinylbenzene, trivinylbenzene, triallyl cyanurate, allyl (meth)acrylate, diallyl maleate and diallyl fumarate.

The rubber-modified graft polymer B is obtained by graft polymerising 50 to 99, preferably 65 to 98, particularly preferably 75 to 95 parts by weight of a mixture of 50 to 99, preferably of 60 to 95 parts by weight of monomers according to B.1.1 and 1 to 50, preferably 5 to 40 parts by weight of monomers according to B.1.2 in the presence of 1 to 50, preferably 2 to 35, particularly preferably 5 to 25 parts by weight of the rubber component B.2, wherein the graft polymerisation is performed using a bulk or solution or bulk/suspension polymerisation process.

When producing the rubber-modified graft polymers B, it is essential that, before the graft polymerisation, the rubber component B.2 is present in dissolved form in the mixture of monomers B.1.1 and/or B.1.2. Rubber component B.2 may accordingly neither be so highly crosslinked that dissolution in B.1.1 and/or B.1.2 is impossible, nor may B.2 already be present in the form of discrete particles at the beginning of the graft polymerisation. The particle morphology and increasing crosslinking of B.2 important to the product properties of B is only subsequently formed during the course of the graft polymerisation (c.f. in this connection, for example, Ullmann, Encyclopädie der technischen Chemie, volume 19, pp. 284 et seq., 4$^{th}$ edition 1980).

A proportion of the random copolymer of B.1.1 and B.1.2 is conventionally present in the polymer B grafted onto or into the rubber B.2, wherein this graft copolymer forms discrete particles in the polymer B. The proportion of the grafted copolymer of B.1.1 and B.1.2 in the total copolymer of B.1.1 and B.1.2, i.e. the grafting yield (=weight ratio of the actually grafted graft monomers to the total quantity of graft monomers used x 100, stated in %) should here be 2 to 40%, preferably 3 to 30%, particularly preferably 4 to 20%.

The average particle diameter of the resultant grafted rubber particles (determined by counting on electron micrographs) is in the range from 0.5 to 5 μm, preferably from 0.8 to 2.5 μm.

Apart from the graft polymers produced by bulk polymerisation, the moulding compositions according to the invention may also contain graft polymer produced by emulsion polymerisation. The description of the graft polymers preferably corresponds to that of those produced by bulk polymerisation, but they are produced by emulsion polymerisation.

The average particle diameter ($d_{50}$ value) of the grafting backbone in the emulsion graft polymer is generally 0.05 to 5 μm, preferably 0.10 to 0.5 μm, particularly preferably 0.20 to 0.40 μm. The gel content of the grafting backbone is at least 30 wt. %, preferably at least 40 wt. %.

The ABS graft polymer is a particularly preferred "emulsion graft polymer".

The weight ratio of graft polymer produced by bulk polymerisation according to component B of the present invention to the graft polymer produced by emulsion polymerisation is 100:0 to 50:50, preferably 80:20 to 60:40.

Component C

Polyalkylene naphthalates are used as component C (c.f. for example EP-A 0846729). This component comprises a polyester, the properties of which are similar to those of polyalkylene terephthalates.

The component C polyalkylene naphthalates may be both homo- and copolymers. The component C polyalkylene naphthalates are reaction products of optionally substituted naphthalenedicarboxylic acid or the reactive derivatives thereof, such as dimethyl esters or anhydrides, with aliphatic, cycloaliphatic or araliphatic diols, together with mixtures of these reaction products. Examples of substituents on the naphthalenedicarboxylic acid are alkyl groups having 1 to 4 carbon atoms, alkylaryl groups and halogens.

Apart from naphthalenedicarboxylic acid, the polyalkylene naphthalates may contain up to 98 mol %, preferably up to 70 mol % of residues of other aromatic or cycloaliphatic dicarboxylic acids having 8 to 14 C atoms or aliphatic dicarboxylic acids having 4 to 12 carbon atoms, such as for example residues of phthalic acid, isophthalic acid, terephthalic acid, 4,4'-diphenyldicarboxylic acid, succinic acid, adipic acid, sebacic acid, azelaic acid, cyclohexanediacetic acid.

Apart from ethylene glycol or 1,4-butandediol residues, the preferred polyalkylene naphthalates may contain up to 20 mol %, preferably up to 10 mol %, of other aliphatic diols having 2 to 12 C atoms or cycloaliphatic diols having 6 to 21 C atoms, for example ethanediol, butanediol, 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4trimethyl-1,3-pentanediol, 2-ethyl-1,3-hexanediol, 2,2-diethyl-1,3-propanediol, 2,5-hexanediol, 1,4-di-(β-hydroxyethoxy)benzene, 2,2-bis-(4-hydroxycyclohexyl)propane, 2,4-dihydroxy-1,1,3,3-tetramethylcyclobutane, 2,2-bis-(4-β-hydroxyethoxyphenyl)propane and 2,2-bis-(4-hydroxyprppoxyphenyl)propane (DE-A 2 407 674, 2 407 776, 2 715 932).

The polyalkylene naphthalates may be branched by incorporating relatively small quantities of tri- or tetrahydric alcohols or tri- or tetrabasic carboxylic acids, for example according to DE-A 1 900 270 and U.S. Pat. No. 3,692,744. Examples of preferred branching agents are trimesic acid, trimellitic acid, trimethylolethane, trimethylolpropane and pentaerythritol.

Particularly preferred polyalkylene naphthalates are those which have been produced solely from naphthalenedicarboxylic acid and the reactive derivatives thereof (for example the dialkyl esters thereof) and ethylene glycol and/or 1,4-butanediol, and mixtures of these polyalkylene naphthalates.

Mixtures of polyalkylene naphthalates contain 1 to 50 wt. %, preferably 1 to 30 wt. %, of polyethylene naphthalate and 50 to 99 wt. %, preferably 70 to 99 wt. %, of polybutylene naphthalate.

Preferably used polyalkylene naphthalates generally have an intrinsic viscosity of 0.4 to 1.5 dl/g, preferably of 0.5 to 1.2 dl/g, measured in phenol/o-dichlorobenzene (1:1 parts by weight) at 25° C. in an Ubbelohde viscosimeter.

The polyalkylene naphthalates may be produced using known methods.

Component D1

Component D1 vinyl (co)polymers usable according to the invention are those prepared from at least one monomer from the series: styrene, α-methylstyrene and/or ring-substituted styrenes, $C_1$–$C_8$ alkyl methacrylate, $C_1$–$C_8$ alkyl acrylate (D.1.1) with at least one monomer from the series: acrylonitrile, methacrylonitrile, $C_1$–$C_8$ alkyl methacrylate, $C_1$–$C_8$ alkyl acrylate, maleic anhydride and/or N-substituted maleimides (D.1.2).

$C_1$–$C_8$ alkyl acrylates or $C_1$–$C_8$ alkyl methacrylates are esters of acrylic acid or methacrylic acid respectively and monohydric alcohols having 1 to 8 C atoms. Methacrylic acid methyl, ethyl and propyl esters are particularly preferred. Methyl methacrylate is stated as a particularly preferred methacrylic acid ester.

Thermoplastic (co)polymers having a composition according to component D1 may be obtained as a secondary product during graft polymerisation in order to produce component B, in particular if large quantities of monomers are grafted onto small quantities of rubber. The quantity of (co)polymer D1 to be used according to the invention does not include these secondary products of graft polymerisation.

Component D1 (co)polymers are resinous, thermoplastic and rubber-free.

The thermoplastic (co)polymers D1 contain 50 to 99, preferably 60 to 95 parts by weight of D.1.1 and 50 to 2, preferably 40 to 5 parts by weight of D.1.2.

Particularly preferred (co)polymers D1 are those prepared from styrene with acrylonitrile and optionally with methyl methacrylate, from α-methylstyrene with acrylonitrile and optionally with methyl methacrylate or from styrene and α-methylstyrene with acrylonitrile and optionally with methyl methacrylate.

The component D1 styrene/acrylonitrile copolymers are known and may be produced by free-radical polymerisation, in particular by emulsion, suspension, solution or bulk polymerisation. The component D1 copolymers preferably have molecular weights $\overline{M}_w$ (weight average, determined by light scattering or sedimentation) of between 15000 and 200000.

Further particularly preferred copolymers D1 according to the invention are random copolymers synthesised from styrene and maleic anhydride, which may be produced from the corresponding monomers by continuous bulk or solution polymerisation with incomplete conversion.

The proportions of the two components of the random styrene/maleic anhydride copolymers suitable according to the invention may be varied within broad limits. The preferred content of maleic anhydride is 5 to 25 wt. %.

The molecular weights (number average $\overline{M}_n$) of the component B random styrene/maleic anhydride copolymers suitable according to the invention may vary over a wide range. The range from 60000 to 200000 is preferred. A preferred intrinsic viscosity for these products is from 0.3. to 0.9 (measured in dimethylformamide at 25° C.; c.f. in this connection Hoffmann, Kromer, Kuhn, *Polymeranalytik I*, Stuttgart 1977, pp. 316 et seq.).

Instead of styrene, the vinyl (co)polymers D1 may also contain ring-substituted styrenes such as p-methylstyrene, vinyltoluene, 2,4-dimethylstyrene and other substituted styrenes such as a-methylstyrene, which may optionally be substituted.

Component D2

Component D2 polyalkylene terephthalates are reaction products prepared from aromatic dicarboxylic acids or the reactive derivatives thereof, such as dimethyl esters or anhydrides, and aliphatic, cycloaliphatic or araliphatic diols, together with mixtures of these reaction products.

Preferred polyalkylene terephthalates contain at least 80 wt. %, preferably at least 90 wt. %, relative to the dicarboxylic acid component, of terephthalic acid residues and at least 80 wt. %, preferably at least 90 wt. %, relative to the diol component, of ethylene glycol and/or 1,4-butanediol residues.

Preferred polyalkylene terephthalates may contain, apart from terephthalic acid residues, up to 20 mol %, preferably up to 10 mol %, of residues of other aromatic or cycloaliphatic dicarboxylic acids having 8 to 14 C atoms or aliphatic dicarboxylic acids having 4 to 12 C atoms, such as for example residues of phthalic acid, isophthalic acid, 4,4'-diphenyldicarboxylic acid, succinic acid, adipic acid, sebacic acid, azelaic acid, cyclohexanediacetic acid.

Preferred polyalkylene terephthalates may contain, apart from ethylene glycol or 1,4-butanediol residues, up to 20 mol %, preferably up to 10 mol %, of other aliphatic diols having 3 to 12 C atoms or cycloaliphatic diols having 6 to 21 C atoms, for example residues of 1,3-propanediol, 2-ethyl-1,3-propanediol, neopentyl glycol, 1,5-pentanediol, 1,6-hexanediol, 1,4-cyclohexanedimethanol, 3-ethyl-2, 4pentanediol, 2-methyl-2,4-pentanediol, 2,2,4-trimethyl-1, 3-pentanediol, 2-ethyl-1,3hexanediol, 2,2-diethyl-1,3-propanediol, 2,5-hexanediol, 1,4-di-(β-hydroxyethoxy)benzene, 2,2-bis-(4-hydroxycyclohexyl)propane, 2,4-dihydroxy-1,1,3,3-tetramethylcyclobutane, 2,2-bis-(4-β-hydroxyethoxyphenyl)propane and 2,2bis-(4-hydroxypropoxyphenyl)propane (DE-A 2 407 674, 2 407 776, 2 715 932).

The polyalkylene terephthalates may be branched by incorporating relatively small quantities of tri- or tetrahydric alcohols or tri- or tetrabasic carboxylic acids, for example according to DE-A 1 900 270 and U.S. Pat. No. 3,692,744. Examples of preferred branching agents are trimesic acid, trimellitic acid, trimethylolethane, trimethylolpropane and pentaerythritol.

Particularly preferred polyalkylene terephthalates are those which have been produced solely from terephthalic acid and the reactive derivatives thereof (for example the dialkyl esters thereof) and ethylene glycol and/or 1,4-butanediol, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

Preferably used polyalkylene terephthalates generally have an intrinsic viscosity of 0.4 to 1.5 dl/g, preferably of 0.5 to 1.2 dl/g, measured in phenol/o-dichlorobenzene (1:1 parts by weight) at 25° C. in an Ubbelohde viscosimeter.

The polyalkylene terephthalates may be produced using known methods (c.f. for example *Kunststoff-Handbuch*, volume VIII, pp. 695 et seq., Carl-Hanser-Verlag, Munich 1973).

Additives

The polymer blends according to the invention may contain conventional additives, such as flame retardants, antidripping agents, ultra-finely divided inorganic compounds, lubricants and mould release agents, nucleating agents, antistatic agents, stabilisers, fillers and reinforcing materials, together with dyes and pigments.

The polymer blends according to the invention may in general contain 0.01 to 20 wt. %, relative to total weight, of flame retardants. Flame retardants which may be mentioned by way of example are organic halogen compounds such as decabromobisphenyl ether, tetrabromobisphenol, inorganic halogen compounds such as ammonium bromide, nitrogen compounds, such as melamine, melamine/formaldehyde resins, inorganic hydroxide compounds such as Mg hydroxide, Al hydroxide, inorganic compounds such as aluminium oxides, titanium dioxides, antimony oxides, barium metaborate, hydroxoantimonate, zirconium oxide, zirconium hydroxide, molybdenum oxide, ammonium molybdate, tin borate, ammonium borate, barium metaborate and tin oxide together with siloxane compounds.

Phosphorus compounds, as they are described in EP-A 0363608, EP-A 0345522 or EP-A 0640655, may furthermore be used as flame retardant compounds.

Such phosphorus compounds are, for example, phosphorus compounds of the formula (IV)

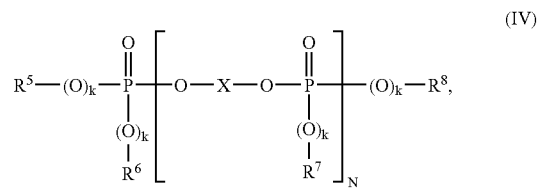

in which $R^5$, $R^6$, $R^7$ and $R^8$ mutually independently each mean $C_1$–$C_8$ alkyl, optionally halogenated, $C_5$–$C_6$ cycloalkyl, $C_6$–$C_{30}$ aryl or $C_7$–$C_{12}$ aralkyl each optionally substituted by alkyl, preferably $C_1$–$C_4$ alkyl, and/or halogen, preferably chlorine, bromine.

$R^5$, $R^6$, $R^7$ and $R^8$ preferably mutually independently denote $C_1$–$C_4$ alkyl, phenyl, naphthyl or phenyl-$C_1$–$C_4$-alkyl. The aromatic groups $R^5$, $R^6$, $R^7$ and $R^8$ may in turn be substituted with halogen and/or alkyl groups, preferably chlorine, bromine and/or $C_1$–$C_4$ alkyl. Particularly preferred aryl residues are cresyl, phenyl, xylenyl, propylphenyl or butylphenyl, together with the corresponding brominated and chlorinated derivatives thereof.

X in the formula (IV) means a mono- or polycyclic aromatic residue having 6 to 30 C atoms. This is derived from diphenols, such as for example diphenylphenol, bisphenol A, resorcinol or hydroquinone or the chlorinated or brominated derivatives thereof.

k in the formula (IV) may, mutually independently, be 0 or 1; n is preferably equal to 1.

N denotes values from 0 to 30, preferably 0 or an average value of 0.3 to 20, particularly preferably of 0.5 to 10, in particular 0.5 to 6.

Mixtures of phosphorus compounds of the formula (IV) preferably contain 10 to 90 wt. %, preferably 12 to 40 wt. %, of at least one monophosphorus compound of the formula (IV) and at least one oligomeric phosphorus compound or a mixture of oligomeric phosphorus compounds in quantities of 10 to 90 wt. %, preferably of 60 to 88 wt. %, relative to the total quantity of phosphorus compounds.

Monophosphorus compounds of the formula (IV) are in particular tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halo-substituted aryl phosphates, methylphosphonic acid dimethyl ester, methylphosphenic acid diphenyl ester, phenylphosphonic acid diethyl ester, triphenylphosphine oxide or tricresylphosphine oxide.

The mixtures of monomeric and oligomeric phosphorus compounds of the formula (IV) have average N values of 0.3 to 20, preferably of 0.5 to 10, in particular of 0.5 to 6.

The phosphorus compounds according to the formula (IV) are known (c.f. for example EP-A 0363608, EP-A 0640655, EP-A 0542522) or may be produced in an analogous manner using known methods (for example *Ullmanns Enzyklopddie der technischen Chemie,* volume 18, pp. 301 et seq. 1979; Houben-Weyl, *Methoden der organischen Chemie,* volume 12/1, p. 43; Beilstein volume 6, page 177).

The polymer blends according to the invention may optionally contain flame retardants differing from compounds of the formula (IV) in a quantity of up to 20 parts by weight. Flame retardants having a synergistic action are preferred. Further flame retardants which may be mentioned by way of example are organic halogen compounds such as decabromobisphenyl ether, tetrabromobisphenol, inorganic halogen compounds such as ammonium bromide, nitrogen compounds, such as melamine, melamine/formaldehyde resins or siloxane compounds. The polymer blends according to the invention may optionally contain inorganic substances other than the inorganic compounds, such as for example inorganic hydroxide compounds, such as Mg hydroxide, Al hydroxide, inorganic compounds such as aluminium oxide, antimony oxide, barium metaborate, hydroxoantimonate, zirconium oxide, zirconium hydroxide, molybdenun oxide, ammonium molybdate, zinc borate, ammonium borate, barium metaborate and tin oxide.

The thermoplastic polymer blends according to the invention may furthermore contain ultra-finely divided inorganic compounds which have a favourable influence upon the flame retardant properties of the polymer blends according to the invention. These inorganic compounds comprise compounds of one or more metals of main groups 1 to 5 or of subgroups 1 to 8 of the periodic system, preferably of main groups 2 to 5 or of subgroups 4 to 8, particularly preferably of main groups 3 to 5 or of subgroups 4 to 8, with the elements oxygen, sulfur, boron, phosphorus, carbon, nitrogen, hydrogen and/or silicon.

Preferred compounds are, for example, oxides, hydroxides, hydrated oxides, sulfates, sulfites, sulfides, carbonates, carbides, nitrates, nitrites, nitrides, borates, silicates, phosphates, hydrides, phosphites or phosphonates.

Preferred ultra-finely divided inorganic compounds are, for example, TiN, $TiO_2$, $SnO_2$, WC, ZnO, $Al_2O_3$, AlO(OH), $ZrO_2$, $Sb_2O_3$, $SiO_2$, iron oxides, $NaSO_4$, $BaSO_4$, vanadium oxides, zinc borate, silicates such as Al silicates, Mg silicates, one-, two-, three-dimensional silicates, mixtures and doped compounds may also be used. These nanoscalar particles may furthermore be surface-modified with organic molecules in order to achieve better compatibility with the polymers. Hydrophobic or hydrophilic surfaces may be produced in this manner.

Average particle diameters are less than or equal to 200 nm, preferably less than or equal to 150 mn, in particular 1 to 100 mn.

Particle size and particle diameter always mean the average particle diameter $d_{50}$ determined by ultracentrifuge measurements according to W. Scholtan et al., *Kolloid-Z. und Z. Polymere* 250 (1972), pp. 782–796.

The inorganic compounds may be present as powders, pastes, sols, dispersions or suspensions. Powders may be obtained by precipitation from dispersions, sols or suspensions.

The powders may be incorporated into the thermoplastics using conventional methods, for example by direct kneading or extruding the constituents of the moulding composition and the ultra-finely divided inorganic powders. Preferred methods comprise the production of a masterbatch, for example in flame retardant additives, other additives, monomers, solvents, in component A or coprecipitation of dispersions of component B or C with dispersions, suspensions, pastes or sols of the ultra-finely divided inorganic materials.

The thermoplastic polymer blends may contain inorganic fillers and reinforcing materials such as glass fibres, optionally chopped or ground, glass beads, glass spheres, lamellar reinforcing material, such as kaolin, talc, mica, silicates, quartz, talcum, titanium dioxide, wollastonite, mica, carbon fibres or the mixture thereof. Chopped or ground glass fibres are preferably used as the reinforcing material. Preferred fillers, which may also have a reinforcing action, are glass spheres, mica, silicates, quartz, talcum, titanium dioxide, wollastonite.

The filled or reinforced polymer blends may contain up to 60, preferably 10 to 40 wt. %, relative to the filled or reinforced moulding composition, of fillers and/or reinforcing materials.

Fluorinated polyolefins may furthermore be used. The fluorinated polyolefins are of a high molecular weight and have glass transition temperatures of above $-30°$ C., in general of above 100° C., fluorine contents, preferably of 65 to 76, in particular of 70 to 76 wt. %, average particle diameters $d_{50}$ of 0.05 to 1000 µm, preferably of 0.08 to 20 µm. The fluorinated polyolefins E generally have a density of 1.2 to 2.3 $g/cm^3$.

Preferred fluorinated polyolefins are polytetrafluoroethylene, polyvinylidene fluoride, tetrafluoroethylene/hexafluoropropylene and ethylene/tetrafluoroethylene copolymers.

The fluorinated polyolefins are known (c.f. EP-A 0640655).

According to the invention, the fluorinated polyolefins E are used in the form of special preparations:

as a coagulated mixture with at least one of components A to C, wherein the fluorinated polyolefin E or polyolefin mixture is mixed as an emulsion with at least one emulsion of components A to C and then coagulated or as a precompound with at least one of components A to C, wherein the fluorinated polyolefins E are mixed as a powder with a powder or pellets of at least one of components A to C and melt-compounded, generally at temperatures of 208° C. to 330° C., in conventional apparatus such as internal kneaders, extruders or twin screw extruders.

Suitable tetrafluoroethylene polymer emulsions are conventional commercial products and are offered for sale, for example, by the company DuPont as Teflon® 30 N.

The invention also includes a process for the production of the polymer blends.

The polymer blends according to the invention containing components A to E are produced by mixing the individual constituents in known manner and melt-compounding or melt-extruding them at temperatures of 200° C. to 300° C. in conventional apparatus such as internal kneaders, extruders or twin screw extruders, wherein the fluorinated polyolefins are preferably used in the form of the above-stated coagulated mixture.

In known manner, the individual constituents may be mixed both in succession and simultaneously, in particular both at approx. 20° C. (room temperature) and at elevated temperature.

The polymer blends of the present invention may be used for the production of mouldings of any kind. Mouldings may, in particular, be produced by injection moulding. Examples of mouldings which may be produced are: casing components of any kind, for example for domestic appliances, such as juice extractors, coffee makers, food mixers, for office equipment, such as computers, printers, monitors or cladding sheets for the building sector and components for the automotive sector. They are also used in electrical engineering applications as they have very good electrical properties.

The polymer blends are particularly suitable for the production of thin-walled mouldings (for example data processing casing components), where the plastics are subjected to particularly severe requirements with regard to notched impact strength and stress cracking resistance.

Another processing method is the production of mouldings by blow moulding or thermoforming from previously produced sheets or films.

The invention is illustrated in greater detail below by some Examples.

1. Definition of the substances used

Component Description

A1 Linear bisphenol A based polycarbonate having a relative solution viscosity of 1.26 measured in $CH_2Cl_2$ as solvent at 25° C. and at a concentration of 0.5 g/100 ml A2 Linear bisphenol A based polycarbonate having a relative solution viscosity of 1.32 measured in $CH_2Cl_2$ as solvent at 25° C. and at a concentration of 0.5 g/100 ml B1 Graft polymer of 40 parts by weight of a copolymer of styrene and acrylonitrile in a 73:27 ratio onto 60 parts by weight of a particulate, crosslinked polybutadiene rubber (average particle diameter $d_{50}$=0.28 μm), produced by emulsion polymerisation B2 Graft polymer of 50 parts by weight of a copolymer of styrene and acrylonitrile in a 72:28 ratio onto 50 parts by weight of a 1:1 ratio mixture of a) a particulate, crosslinked polybutadiene rubber (average particle diameter $d_{50}$=0.4 μm) and of b) a particulate, crosslinked polybutadiene rubber (average particle diameter $d_{50}$=0.1 μm), produced by emulsion polymerisation C1 Polyethylene naphthalate having a Vicat B120 (ISO 306) temperature of 118° C. and a melt volume rate (ISO 1133 270° C., 5 kg) of 12.1 $cm^3$/10 min C2 Polyethylene naphthalate-co-terephthalate having a Vicat B120 (ISO 306) temperature of 114° C. and a melt volume rate (ISO 1133 270° C., 5 kg) of 10.7 $cm^3$/10 min D1 Styrene/acrylonitrile copolymer having a styrene/acrylonitrile ratio of 72:28 and an intrinsic viscosity of 0.55 dl/g (measured in dimethylformamide at 20° C.)

D2 Polybutylene terephthalate having a viscosity index J to DIN 53 728/3 of 140 $cm^3$/g and a Vicat B120 (ISO 306) temperature of 170° C.

E Pentaerythritol tetrastearate

Tensile strength is determined to ISO 527.

Elongation at break is determined to ISO 527.

The melt volume rate is determined to ISO 1133.

The natural colour tone is assessed visually. The degree of lightening (+, ++) of the Examples according to the invention is assessed on the basis of the Comparative Example as control (value "0").

2. Tables

TABLE 1

Moulding compositions and the properties thereof

|  | Comparison | Invention 1 | Invention 2 |
|---|---|---|---|
| A1 parts by weight, PC | 70 | 65 | 65 |
| B1 parts by weight, ABS | 13 | 13 | 13 |
| C1 parts by weight, PEN | — | 5 | — |
| C2 parts by weight, PENCO | — | — | 5 |
| D1 parts by weight, SAN | 17 | 17 | 17 |
| E parts by weight, PETS | 0.5 | 0.5 | 0.5 |
| Notched impact strength, Izod 23° C. $kJ/m^2$ | 56 | 55 | 55 |
| Critical temp. ° C. | <−30 | <−30 | <−30 |
| Melt volume rate $cm^3$/10 min | 8.6 | 10.7 | 13.3 |
| Tensile strength MPa | 2180 | 2183 | 2187 |
| Elongation at break % | 88 | 122 | 123 |
| Natural colour tone (visual assessment) | 0 | + | + |

The moulding compositions according to the invention are distinguished by a favourable combination of properties comprising improved flow, mechanical properties and natural colour tone. Surprisingly, the natural colour tone is distinctly improved by the addition, relative to the prior art, of components C1 or C2, wherein in contrast with colouring pigments, mechanical properties are additionally improved. Flow, here stated as the melt volume rate, also increases.

TABLE 2

Moulding compositions and properties thereof

|  | Comp. | Inv. 3 | Inv. 4 | Inv. 5 | Inv. 6 |
|---|---|---|---|---|---|
| A1 parts by weight, PC | 60 | 60 | 60 | 60 | 60 |
| B1 parts by weight, ABS | 20 | 20 | 20 | 20 | 20 |
| C1 parts by weight, PEN | — | 20 | 10 | — | — |
| C2 parts by weight, PENCO | — | — | — | 20 | 10 |
| D1 parts by weight, SAN | 20 | — | 10 | — | 10 |
| E parts by weight, PETS | 0.5 | 0.5 | 0.5 | 0.5 | 0.5 |
| Notched impact strength (Izod 23° C.) $kJ/m^2$ | 56 | 51 | 59 | 59 | 55 |
| Critical temp. ° C. | <−30 | <−30 | <−30 | <−30 | <−30 |
| Vicat temp. VSTB 120 ISO306 ° C. | 122 | 130 | 127 | 125 | 128 |
| Elongation at break % | 115 | 115 | 117 | 116 | 117 |
| Natural colour tone (visual assessment) | 0 | ++ | + | ++ | + |

The moulding compositions according to the invention are distinguished by a favourable combination of mechanical and thermal properties and of natural colour tone. Surprisingly, the natural colour tone is distinctly improved by the addition, relative to the prior art, of components C1 or C2, while mechanical properties such as notched impact strength and elongation at break are maintained or improved. An increase in Vicat temperature, advantageous for many applications, may additionally be achieved.

TABLE 3

Moulding compositions and the properties thereof

|  | Comparison | Invention 7 |
|---|---|---|
| B2, ABS parts by weight | 30 | 30 |
| D1, SAN parts by weight | 70 | 70 |
| C2, PEN parts by weight | — | 2 |
| E parts by weight | 0.5 | 0.5 |
| Notched impact strength Izod 23° C. kJ/m² | 8 | 10 |
| Melt volume rate cm³/10 min | 26 | 25 |
| Elongation at break % | 17 | 17 |
| Natural colour tone (visual assessment) | 0 | + |

The moulding compositions according to the invention are distinguished by a favourable combination of properties comprising improved natural colour tone and flow or mechanical properties. Surprisingly, the natural colour tone is distinctly improved (+) by the addition, relative to the prior art, of components C1 or C2, while mechanical and rheological properties, such as notched impact strength and melt volume rate respectively, are maintained.

TABLE 4

Moulding compositions and the properties thereof

|  | Comparison | Inv. 8 | Inv. 9 |
|---|---|---|---|
| A2 parts by weight | 40 | 40 | 40 |
| D2 parts by weight | 60 | 30 | — |
| C1 parts by weight | — | 30 | 60 |
| E parts by weight | 0.5 | 0.5 | 0.5 |
| Notched impact strength Izod 23° C. kJ/m² | 7 | 7 | 7 |
| Elongation at break % | 134 | 164 | 159 |
| Pearlescent effect (visual assessment) | 0 | + | ++ |

The moulding compositions according to the invention exhibit a very attractive pearlescent effect. Casings for mobile telephones could successfully be produced from the material with notched impact strength being retained and elongation at break being improved.

The invention claimed is:

1. A thermoplastic molding composition comprising
   a) 60–65 parts by weight of a poly(ester) carbonate,
   b) 13–20 parts by weight of a rubber modified graft polymer having a graft base and
   c) 5–20 parts by weight of a member selected from the group consisting of polyethylene naphthalate and polyethylene naphthalate co-terephthalate said rubber modified graft polymer including rubber B.2 grafted with at least one random (co)polymer of B.1.1 and/or B.1.2, wherein B.2 is at least one rubber selected from the group consisting of diene, EP(D)M, polyurethane, silicone, chloroprene and ethylene vinyl acetate and wherein B.1.1 is at least one member selected from the group consisting of styrene, α-methylstyrene, halo-ring substituted styrene and alkyl-ring-substituted styrene and (meth)acrylic acid $C_1$–$C_8$ alkyl ester and wherein B.1.2 is at least one member selected from the group consisting of unsaturated nitrile and (meth)acrylic acid $C_1$–$C_8$ alkyl ester wherein the average Particle diameter ($d_{50}$) of the grafted rubber determined by counting on electron micrographs is 0.5 to 5 μm.

2. The composition of claim 1 wherein the average particle diameter is 0.5 to 2.5 μm.

3. The composition of claim 1 wherein the average particle diameter is 0.8 to 2.5 μm.

4. The composition if claim 1 further containing at least one member selected from the group consisting of vinyl copolymer and polyalkylene terephthalate.

5. The composition of claim 1 wherein the graft base is at least one rubber selected from the group consisting of diene, EP(D)M, acrylate, polyurethane, silicone, chloroprene and ethylene/vinyl acetate.

6. The composition of claim 1 further containing at least one member selected from the group consisting of flame retardant, stabilizer, pigment, mold release agent, flow auxiliary and antistatic agent.

7. The composition of claim 6 wherein the flame retardant is a phosphates conforming to formula (IV)

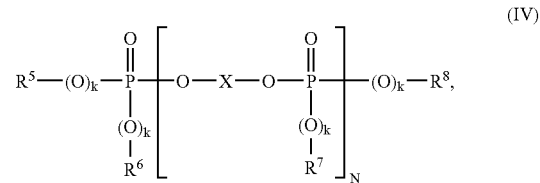

in which
   $R^5$, $R^6$, $R^7$ and $R^8$ independently of one another denote a member selected from the group consisting of $C_1$–$C_8$ alkyl, $C_5$–$C_6$ cycloalkyl, $C_6$–$C_{30}$ aryl and $C_7$–$C_{12}$ aralkyl,
   X denotes a mono- or polycyclic aromatic radical having 6 to 30 C atoms,
   k independently of one another is 0 or 1 and
   N is 0 to 30.

8. The composition of claim 7 wherein the $C_1$–$C_8$ alkyl is halogenated.

9. The composition of claim 7 wherein at least one member selected from the group consisting of $C_5$–$C_6$ cycloalkyl, $C_8$–$C_{30}$ aryl or $C_7$–$C_{12}$ aralkyl is substituted by at least one member selected from a second group consisting of halogen and alkyl.

10. A method of using the composition of claim 1 comprising forming a molded article.

11. A molded article comprising the composition of claim 1.

* * * * *